W. KNOWLES.
HOSE COUPLING.

No. 39,580.     Patented Aug. 18, 1863.

Witnesses:

Inventor:
Willard Knowles

UNITED STATES PATENT OFFICE.

WILLARD KNOWLES, OF BOSTON, MASSACHUSETTS.

IMPROVEMENT IN HOSE-COUPLINGS.

Specification forming part of Letters Patent No. 39,580, dated August 18, 1863.

*To all whom it may concern:*

Be it known that I, WILLARD KNOWLES, a resident of Boston, in the county of Suffolk and State of Massachusetts, have invented a new and useful or Improved Hose-Coupling; and I do hereby declare the same to be fully described in the following specification and illustrated by the accompanying drawings, of which—

Figure 5:
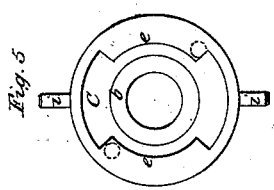
Figure 6:
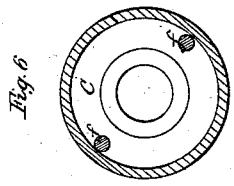
Figure 3:
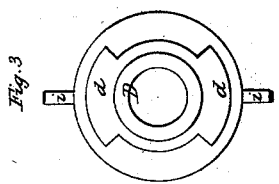
Figure 4:
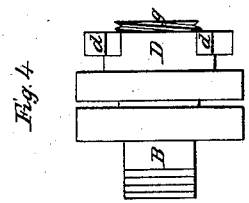
Figure 1:
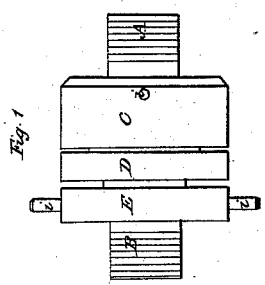
Figure 2:
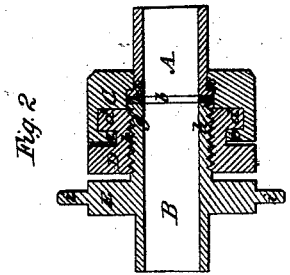

Figure 1 is a side view, and Fig. 2 a longitudinal section, of it. Fig. 3 is a front view, and Fig. 4 a side view, of the male interlocking connection. Fig. 5 is a front view, and Fig. 6 a transverse section, of the female interlocking connection.

In the drawings, A and B are two hose necks or tubes, each of which serves for the fixation of the extremity of a flexible conduit or water-hose to one of the parts constituting the hose-coupling. One of these tubular necks has a length about double that of the other, the shorter one being provided with a flange, $a$, going around it at its inner end. This latter neck revolves freely in the female interlocking connection C, and has an annular washer, $b$, placed against its inner end. The two interlocking connections C D are so constructed that the male one, D, may be inserted axially into the other, and on being revolved therein a short distance will be locked to it, quadrantal arc projections $d\ d$ of the part D lapping on others—viz., $e\ e$ of the part C. One or more pins or stops, $f$, serve to arrest the rotary movement of the part D within the chamber of the part C. The said part $d$ is concentric with and screwed upon the longer neck or tube, B, or, in other words, the said tube has a male screw, $g$, cut on it to screw through a female screw, $h$, made through the part D. The said neck-tube is also provided with a cylindrical projection, E, whose external diameter corresponds to those of the parts C D. The periphery of the projection E, as well as that of the part C, should have one or more holes or recesses in it, or may have in lieu thereof one or more studs, $i\ i$, such being for the purpose of enabling a lever or spanner to be applied to each part C E for the purpose of screwing the neck-tube B firmly up against the washer on the inner end of the neck-tube A. As soon as the parts C D may be interlocked, a slight amount of rotation of the neck tube B will generally suffice to screw it hard up against the washer of the tube A.

The great advantage of this hose-connection is the facility rendered by it in connecting and disconnecting two hoses or flexible water-conduits.

I claim as my invention—

The said improved hose-coupling, as consisting of the two interlocking connections C D, and the screws $g\ h$, constructed, arranged, and applied together and to the hose necks or tubes A B, substantially in manner as specified.

WILLARD KNOWLES.

Witnesses:
 R. H. EDDY,
 F. P. HALE, Jr.